(12) United States Patent
Huberman et al.

(10) Patent No.: US 12,506,668 B2
(45) Date of Patent: Dec. 23, 2025

(54) METHODS FOR PREDICTING FUTURE NETWORK TRAFFIC

(71) Applicant: CABLE TELEVISION LABORATORIES, INC., Louisville, CO (US)

(72) Inventors: Bernardo Huberman, Palo Alto, CA (US); Scott H. Clearwater, Menlo Park, CA (US)

(73) Assignee: Cable Television Laboratories, Inc., Louisville, CO (US)

(*) Notice: Subject to any disclaimer, the term of this patent is extended or adjusted under 35 U.S.C. 154(b) by 103 days.

(21) Appl. No.: 16/522,167

(22) Filed: Jul. 25, 2019

(65) Prior Publication Data

US 2020/0036639 A1    Jan. 30, 2020

Related U.S. Application Data

(60) Provisional application No. 62/703,715, filed on Jul. 26, 2018.

(51) Int. Cl.
| | | |
|---|---|---|
| *H04L 12/801* | (2013.01) | |
| *H04L 41/149* | (2022.01) | |
| *H04L 43/022* | (2022.01) | |
| *H04L 43/0876* | (2022.01) | |
| *H04L 47/125* | (2022.01) | |
| *H04L 47/127* | (2022.01) | |
| *H04L 47/83* | (2022.01) | |

(52) U.S. Cl.
CPC .......... *H04L 43/022* (2013.01); *H04L 41/149* (2022.05); *H04L 43/0876* (2013.01); *H04L 47/125* (2013.01); *H04L 47/127* (2013.01); *H04L 47/83* (2022.05)

(58) Field of Classification Search
CPC ....... H04L 47/00; H04L 43/00; H04L 41/147; H04L 43/022; H04L 47/127; H04L 41/149; H04L 41/145
See application file for complete search history.

(56) References Cited

U.S. PATENT DOCUMENTS

| | | | |
|---|---|---|---|
| 2007/0208497 A1* | 9/2007 | Downs | G08G 1/0104 701/117 |
| 2012/0157106 A1* | 6/2012 | Wang | H04W 24/08 455/446 |
| 2014/0019258 A1* | 1/2014 | Morris | G06Q 30/0263 705/14.66 |
| 2015/0127243 A1* | 5/2015 | Jang | G08G 1/0116 701/117 |
| 2015/0332145 A1* | 11/2015 | Vasseur | H04L 43/062 706/12 |
| 2015/0381498 A1* | 12/2015 | Nomura | H04L 45/22 370/217 |
| 2016/0210341 A1* | 7/2016 | Zhuang | G06F 16/27 |
| 2018/0309636 A1* | 10/2018 | Strom | H04L 41/147 |
| 2019/0372857 A1* | 12/2019 | Gandhi | H04L 41/0826 |

* cited by examiner

*Primary Examiner* — Derrick W Ferris
*Assistant Examiner* — Won Jun Choi
(74) *Attorney, Agent, or Firm* — PdZ Patent Law, PLLC

(57) ABSTRACT

The present disclosure generally relates to apparatus, software and methods for predicting future network traffic. The disclosed apparatus, software and methods alleviate congestion and/or increase overall traffic flow by providing methods for reallocating future idle capacity.

18 Claims, 3 Drawing Sheets

METHODS FOR PREDICTING FUTURE NETWORK TRAFFIC

CROSS-REFERENCE TO RELATED APPLICATIONS

This application claims the benefit of and priority to U.S. Provisional Patent Application No. 62/703,715, filed Jul. 26, 2018, which is hereby incorporated by reference in its entirety.

STATEMENT REGARDING FEDERALLY SPONSORED RESEARCH

None.

BACKGROUND

Digital content has become increasingly bandwidth intensive with the availability of streaming audio and/or video content, online interactive video games, network/Internet telephony and cloud-based storage. These activities, and others, have placed a high burden on existing data networks. New infrastructure is constantly being added to increase network capacity, but in order to keep apace with demand, efficiency of both wired and wireless networks is also a priority.

SUMMARY

The present disclosure generally relates to apparatus, software and methods for predicting future network traffic to alleviate congestion, improve service quality and make efficient use of network capacity. The disclosed apparatus, software and methods achieve these objectives by predicting future network traffic and preemptively reallocating bandwidth to resources anticipated to have idle capacity.

The disclosed methods use historical traffic data and a clustering algorithm to group similar historical traffic patterns together. Each group of historic traffic patterns has associated with it a maximum traffic rate in some future time window. The group of future maximum traffic rates together define the probability distribution for maximum traffic for each historical traffic group, or cluster. The maximum traffic probability distribution is used in conjunction with a threshold quality of service (QoS) to reallocate any bandwidth available above the maximum traffic and threshold QoS levels. For example, if a traffic level less than the QoS threshold is 98% likely under the current conditions, then, with a probability of 98%, bandwidth above the threshold can be reallocated without a QoS violation. Stated another way, there is only a 2% chance of a QoS violation under the exemplary conditions.

In an aspect, a method for predicting future network traffic comprises: measuring network traffic over a first time window to create a traffic history, each traffic history being associated with a measured future traffic rate within a second time window; forming clusters of traffic histories; determining a probability distribution of the measured future traffic rates within the second time window for each cluster of traffic histories; matching current network traffic to one of the clusters; and predicting that a traffic rate of the current network traffic within a time period corresponding to the second time window will not exceed a specified statistical parameter of the probability distribution of the measured future traffic rates of the one cluster. In an embodiment, the specified statistical parameter of the probability distribution is selected from the group consisting of a mean, median, average, mode, percentile and combinations thereof. In an embodiment, the specified statistical parameter of the probability distribution is a percentile.

In an embodiment, matching current network traffic to a cluster is performed by a processor executing a predictor algorithm. In an embodiment, matching the current network traffic with a cluster comprises determining a minimum distance between the current network traffic and a center of a cluster. The center of a cluster is typically defined as the mean value of each dimension of all the members of a cluster, where the distance metric itself could be a Euclidean measure or more generally a Minkowski measure (where n=2 is Euclidean). For example, if a cluster comprises a 3-step history with three members: [1, 2, 3], [4, 8, 9], [7, 8, 9], then the cluster centers are: [(1+4+7)/3, (2+8+8)/3, (3+9+9)/3]=[4, 6, 7]. Other approaches are possible; this example relates to k-means calculations.

In an embodiment, measuring network traffic comprises measuring network traffic volume at pre-defined sampling intervals within the first time window. In an embodiment, the pre-defined sampling intervals are continuous or discontinuous and/or of equal duration or unequal duration. Generally, the time between measurements need not be equal, but the measurement pattern must be consistent across traffic histories.

In an embodiment, measuring network traffic comprises measuring network traffic volume at random sampling intervals within the first time window. Generally, after a first network traffic history is obtained at random sampling intervals, all subsequent network traffic histories would be obtained using the same sampling intervals.

In an embodiment, the future traffic rates are maximum traffic rates, minimum traffic rates, average traffic rates, mean traffic rates, quantile traffic rates or percentile traffic rates.

In an embodiment, the first time window and the second time window are continuous or discontinuous and/or of equal duration or unequal duration.

In an embodiment, a clustering algorithm is used to form clusters of measured traffic histories. Clustering algorithms suitable for carrying out the clustering function are known. For example, a k-means algorithm, mean-shift clustering, Density-Based Spatial Clustering of Applications with Noise (DBSCAN), expectation maximization, and agglomerative hierarchical clustering can be used to form clusters of measured traffic histories. Although it would be possible to match current network traffic to a single measured traffic history, clusters comprising multiple measured traffic histories increase the sample size and improve the statistical accuracy of the data and of the prediction.

In an embodiment, clustering includes grouping traffic histories (i) from the same first time window, (ii) with the same pre-defined sampling intervals, (iii) from the same source or from different sources and/or (iv) of the same signal type or different signal types. For example, a source may be selected from the group consisting of a network channel, a hub, a wireless cell, a base station and a modem. A signal type may be selected from the group consisting of an electrical signal, a radio frequency signal, an optical signal and combinations thereof.

In an embodiment, the predicted traffic rate of the current network traffic within the time period corresponding to the second time window is subtracted from a maximum network capacity to determine a future idle capacity during the second time interval. In an embodiment, a measured future traffic rate is a measured maximum future traffic rate and a predicted maximum future traffic rate is subtracted from a maximum network capacity to determine a future idle capacity during the second time interval. In an embodiment, at least a portion of the future idle capacity of the network is reallocated.

In an embodiment, a method for predicting future network traffic further comprises ensuring a minimum quality of service is maintained when at least a portion of the future idle capacity of the network is reallocated. For example, ensuring a minimum quality of service may include assigning a quality of service threshold that sets or defines a minimum reliability.

In an aspect, a non-transitory computer-readable medium has a plurality of non-transitory instructions executable with a processor to predict future network traffic, the plurality of non-transitory instructions being executable for: measuring network traffic over a first time window to create a traffic history, each traffic history being associated with a measured future traffic rate within a second time window; forming clusters of traffic histories; determining a probability distribution of the measured future traffic rates within the second time window for each cluster of traffic histories; matching current network traffic to one of the clusters; and predicting that a traffic rate of the current network traffic within a time period corresponding to the second time window will not exceed a specified statistical parameter of the probability distribution of the measured future traffic rates of the one cluster.

In an embodiment, the plurality of non-transitory instructions are executable for determining a future idle capacity during the second time interval when the predicted traffic rate of the current network traffic within the time period corresponding to the second time window is subtracted from a maximum network capacity. In an embodiment, the plurality of non-transitory instructions are executable for determining a future idle capacity during the second time interval when the measured future traffic rate is a measured maximum future traffic rate and the predicted maximum future traffic rate is subtracted from a maximum network capacity. In an embodiment, the plurality of non-transitory instructions are executable for reallocating at least a portion of the future idle capacity of the network.

In an embodiment, the plurality of non-transitory instructions are executable for ensuring that a minimum quality of service is maintained when at least a portion of the future idle capacity of the network is reallocated.

In an embodiment, those of skill in the art will appreciate that instead of predicting future network traffic the present apparatus, software and methods could be used to deduce a previous traffic rate by matching current network traffic to an earlier time window, for example, to explain why a problem arose.

BRIEF DESCRIPTION OF THE DRAWINGS

Illustrative embodiments of the present invention are described in detail below with reference to the attached drawings, wherein.

DETAILED DESCRIPTION

Figure 1:
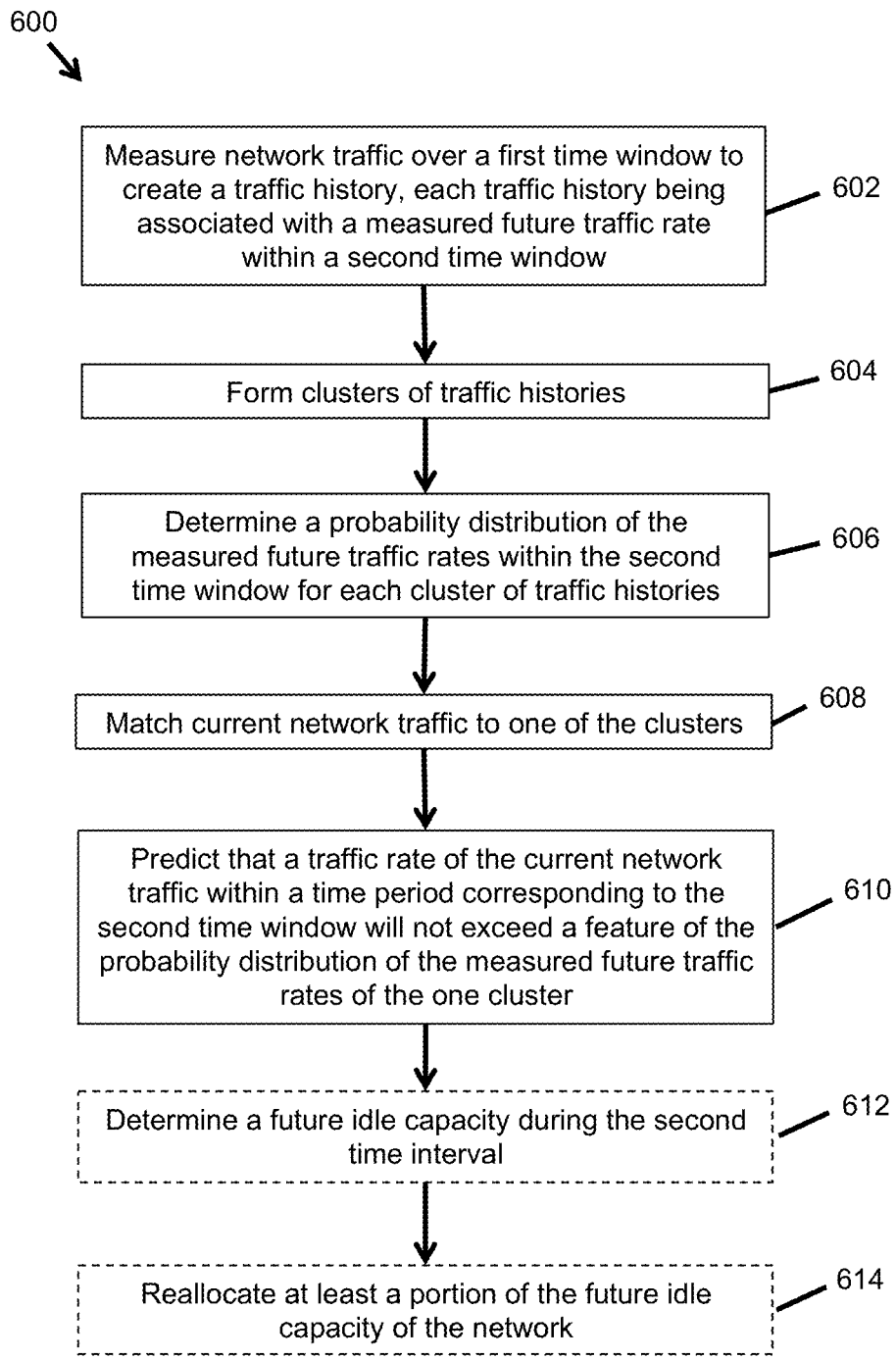
FIG. 1 is a flowchart illustrating steps in a method for predicting future network traffic, according to an embodiment.

In general, the terms and phrases used herein have their art-recognized meaning, which can be found by reference to standard texts, journal references and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "channel" or "communication channel" refers to a physical transmission medium, such as a wire or optical cable, or a designated non-tangible broadcast medium, such as a wavelength used to convey an information signal from a sender(s) to a receiver(s). A channel has a certain capacity for transmitting information, often measured by its bandwidth in Hz or its data rate in bits per second.

Disclosed herein are methods for predicting future network traffic and, optionally, reallocating network resources based on the prediction. The methods assume that users on the same network have access to and share the same group of communication channels, e.g., DOCSIS 3.0/3.1 channels, WDM wavelength channels, etc., and that traffic from these users merges at a common hub in the network.

The hub is any system (e.g., a cable modem termination system (CMTS)), device, software, or combination thereof, typically located in a cable company's hub site, or "headend", which is used to provide high speed data services (i.e., the downstream transmissions), such as cable Internet and Voice over Internet Protocol. The channels are generally network bridges and modems that provide bi-directional data communication via radio frequency channels on a Hybrid Fiber-Coaxial (HFC) or Radio Frequency over Glass (RFoG). The channels are used to deliver broadband Internet access in the form of cable Internet, taking advantage of the high bandwidth of a HFC and RFoG network.

The hub is operable to configure the channels to communicate via a specific protocol (e.g., Data Over Cable Service Interface Specification, or "DOCSIS") specification. In this regard, the hub is operable to send control signals that direct the channels to operate in a particular manner with respect to the employed protocol. In an embodiment, the hub is operable to specify one or more channels for transmitting and/or receiving data from a network user or group of network users. As such, network bandwidth may be reallocated at the hub by redirecting traffic from a congested channel to one or more idle channels.

FIG. 1 is a flowchart 600 illustrating steps in a method for predicting future network traffic. In step 602, network traffic over a first time window is measured to create a traffic history, each traffic history being associated with a measured future traffic rate within a second time window. In step 604, clusters of the traffic histories are created, for example, using a clustering algorithm. A probability distribution of the measured future traffic rates within the second time window for each cluster of traffic histories is determined in step 606. In step, 608, current network traffic is matched to one of the clusters. In step 610, a prediction is made that a traffic rate of the current network traffic within a time period corresponding to the second time window will not exceed a specified statistical parameter (e.g., mean, median, average, mode, quantile, percentile) of the probability distribution of the measured future traffic rates of the one cluster that the current network traffic is matched to. In optional step 612, a future idle capacity during the second time interval is determined, and optionally, at least a portion of the future idle capacity of the network is reallocated in step 614.

Figure 2:
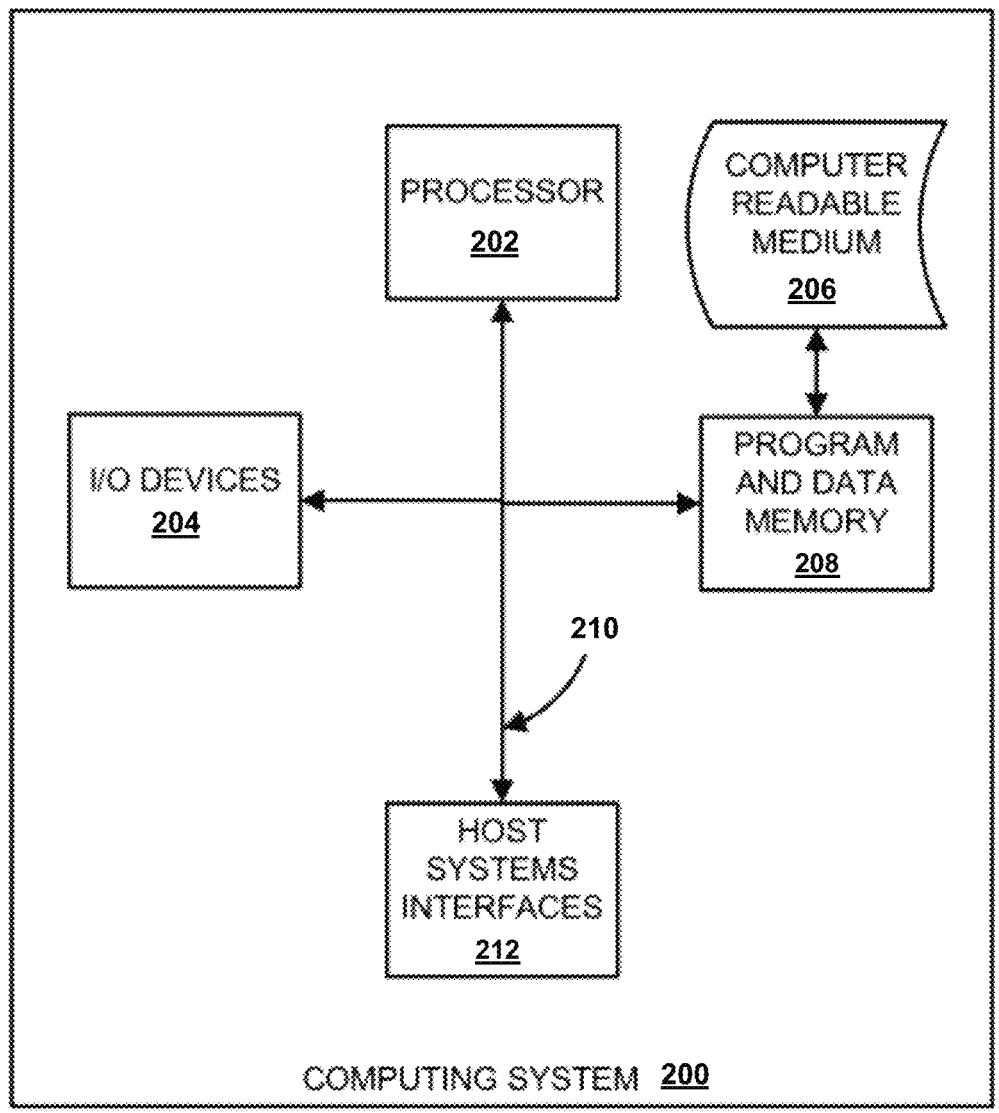
FIG. 2 is a block diagram of an exemplary computing system in which a computer readable medium provides instructions for performing methods described herein.

The embodiments herein may be implemented in a variety of ways as a matter of design choice. For example software and processors performing CMTS functions could be configured in a hub or a headend facility, and the physical layer functions could be in programmable hardware in the node. In this regard, the invention can take the form of an entirely hardware embodiment, an entirely software embodiment or an embodiment containing both hardware and software elements. In an embodiment, the invention is implemented in software, which includes but is not limited to firmware, resident software, microcode, etc. FIG. 2 illustrates a computing system 200 in which a computer readable medium 206 may provide instructions for performing any of the methods disclosed herein.

Furthermore, the invention can take the form of a computer program product accessible from the computer readable medium 206 providing program code for use by or in connection with a computer or any instruction execution system. For the purposes of this description, the computer readable medium 206 can be any apparatus that can tangibly store the program for use by or in connection with the instruction execution system, apparatus, or device, including the computer system 200.

The medium 206 can be any tangible electronic, magnetic, optical, electromagnetic, infrared, or semiconductor system (or apparatus or device). Examples of a computer readable medium 206 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 200, suitable for storing and/or executing program code, can include one or more processors 202 coupled directly or indirectly to memory 208 through a system bus 210. The memory 208 can include local memory employed during actual execution of the program code, bulk storage, and cache memories which provide temporary storage of at least some program code in order to reduce the number of times code is retrieved from bulk storage during execution. Input/output (I/O) devices 204 (including but not limited to keyboards, displays, pointing devices, etc.) can be coupled to the system either directly or through intervening I/O controllers. Network adapters may also be coupled to the system to enable the computing system 200 to become coupled to other data processing systems, such as through host systems interfaces 212, or remote printers or storage devices through intervening private or public networks. Modems, cable modem and Ethernet cards are just a few of the currently available types of network adapters.

The apparatus, software and methods disclosed herein are further illustrated by the following Example. This Example is for illustrative purposes only and is not intended to limit the invention.

Example

This Example verifies an exemplary method disclosed herein.

Let $T=\{t_1, t_2, \ldots, t_n\}$ be a traffic history of traffic amounts (e.g., bytes) within a fixed time window, $\tau$, and where the traffic is sampled at pre-defined intervals, $\Delta t_i$, that may be equal or different and may be continuous or discontinuous.

Let $H=\{T_1, T_2, \ldots, T_h\}$ be a collection of traffic histories as defined above that may be overlapping or not, all of which have the same time window $\tau$ and sampling intervals, $\Delta t_i$.

Each $T_i$ has associated with it a future maximum traffic rate within some fixed time interval, W and the maximum traffic rates in that window are given by $$M_i = \max\{T_i\}$$

Let A be a clustering algorithm used to form clusters of histories H into k clusters, $$A(H) = C = \{c_1, c_2, c_k\}$$

Each cluster has within it a set of $\{T_i\}$ and its corresponding set of $\{M_i\}$ From the set of maxima associated with a cluster, $\{M_i\}$, a cumulative probability distribution function of traffic maxima can be formed, $CDF_i$.

Now consider a particular case where we are given the current history $T_0$ and we need to find the cluster that corresponds to this history using the clustering algorithm. Armed with the previously learned clusters, C, and using a predictor algorithm, P $$P(C, T_0) = c_0 = \text{cluster of current time history given previously defined clusters}$$

Next, given a QoS=Q, the corresponding maximum future traffic, $\{M_0\}$, for the current cluster 0 can be found, $$\mu_0^Q = CDF_0^{-1}(Q, \{M_0\})$$

This maximum future traffic, $\mu_0^Q$, can then be used to reallocate future traffic in the future time interval W. In particular, if the maximum capacity of the network is X then in the next future interval, W, the amount of bandwidth that can be reallocated subject to Q is $$X - \mu_0^Q$$

As a specific embodiment, a k-means algorithm was used to cluster the traffic. Briefly, k-means clustering partitions a set of measurements (H in this case) into k clusters. The version of the k-means algorithm used came from the sklearn module in python with default settings.

Figure 3:
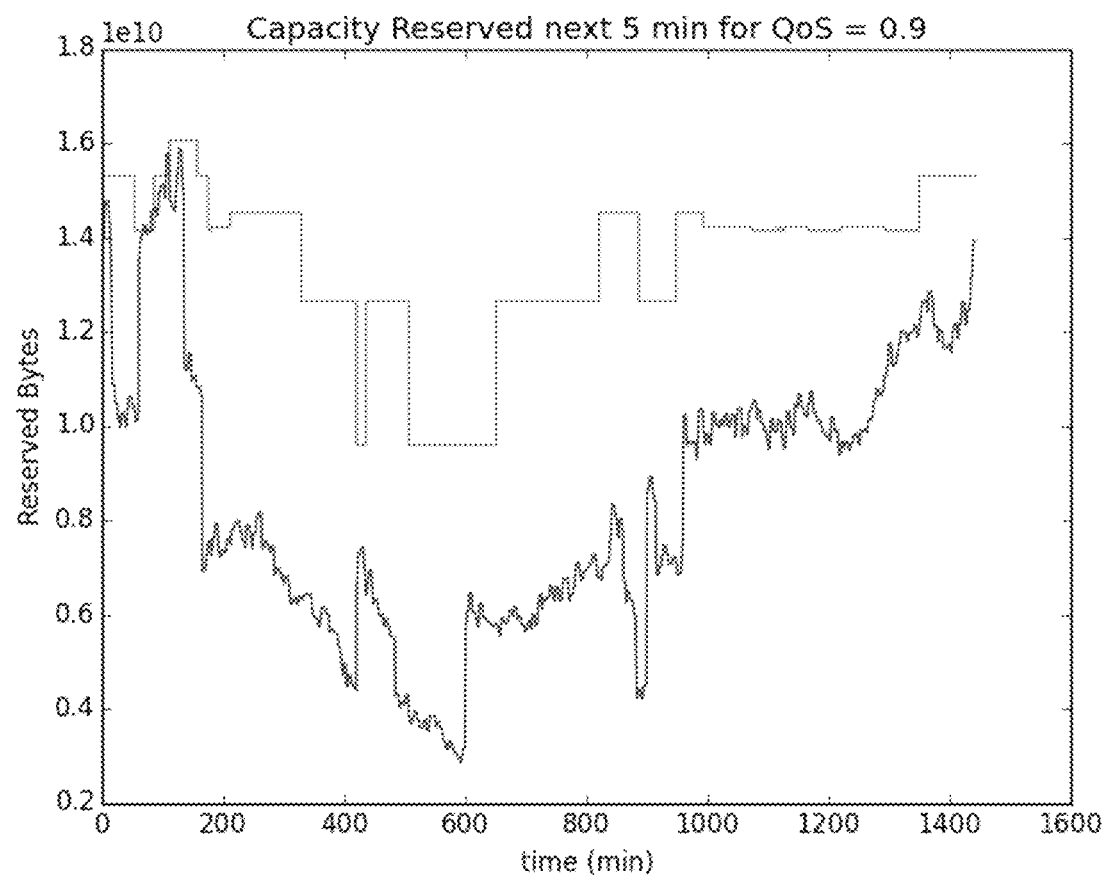
FIG. 3 is a graph of actual network bandwidth usage over time and predicted maximum future network traffic over the same time.

An example of how the algorithm performed on real data is shown in FIG. 3, which is a graph of actual network bandwidth usage over time and predicted maximum future network traffic over the same time. The bottom line corresponds to the actual future traffic from a very large set of cable modems over a period of one day sampled in 1-minute intervals. Not shown is the historical data that preceded it and which was used to find the current cluster. Once the current cluster was found, the corresponding $\mu_0^Q$ was found with Q=0.9. This was done for each time interval, stepping the historical period forward 1 minute at a time to create the entire plot shown out to one day. The historical period, r, used was 1 hour and the future time window, W, was 5 minutes. The top line is $\mu_0^Q$ at each time step and corresponds to one of the k=9 clusters found by P. Note that, as expected, the actual traffic is below the predicted line and any bandwidth above the top line could have been reallocated. Note that the method does not depend on the particular clustering algorithm used, or the source(s) of the traffic (it could be from one or more devices and have any kind of traffic, e.g., video, data, etc.).

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method for predicting future network traffic, the method comprising:

measuring network traffic over a first time window to create a plurality of traffic histories over the first time window, each traffic history over the first time window including a plurality of respective network traffic measurements made at different times within the first time window;

applying a clustering algorithm to the plurality of traffic histories over the first time window to group the plurality of traffic histories over the first time window into k clusters of traffic histories defined by similar network traffic over the first time window, wherein (i) k is an integer greater than one and (ii) each cluster of the k clusters of traffic histories includes a respective two or more of the plurality of traffic histories over the first time window;

matching current network traffic to a first cluster of traffic histories of the k clusters of traffic histories based on similarity of the current network traffic to the first cluster of traffic histories;

determining a probability distribution of maximum future traffic values associated with the first cluster of traffic histories, each maximum future traffic value associated with the first cluster of traffic histories representing a maximum future value of a respective one of the traffic histories over the first time window of the first cluster of traffic histories during a second time window that is after the first time window; and predicting that a future network traffic rate will not exceed a specified statistical parameter of the probability distribution of the maximum future traffic values associated with the first cluster of traffic histories.

2. The method of claim 1, wherein the step of measuring network traffic comprises measuring network traffic volume at pre-defined sampling intervals within the first time window.

3. The method of claim 2, wherein the pre-defined sampling intervals are continuous or discontinuous and of equal duration or unequal duration.

4. The method of claim 1, wherein the first time window and the second time window are continuous or discontinuous and of equal duration or unequal duration.

5. The method of claim 1, wherein the specified statistical parameter of the probability distribution of the maximum future traffic values is selected from the group consisting of a mean, median, average, mode, quantile, percentile and combinations thereof.

6. The method of claim 1, wherein the step of applying the clustering algorithm to the plurality of traffic histories over the first time window to group the plurality of traffic histories over the first time window into k clusters of traffic histories includes grouping traffic histories (i) with the same pre-defined sampling intervals, (ii) from the same source or from different sources and/or (iii) of the same signal type or different signal types.

7. The method of claim 6, wherein a source is selected from the group consisting of a network channel, a hub, a wireless cell, a base station and a modem.

8. The method of claim 6, wherein a signal type is selected from the group consisting of an electrical signal, a radio frequency signal, an optical signal and combinations thereof.

9. The method of claim 1, wherein the step of matching current network traffic to the first cluster of traffic histories uses a predictor algorithm.

10. The method of claim 1, further comprising subtracting a predicted value of the future network traffic rate from a maximum network capacity to determine a future idle capacity of the network.

11. The method of claim 10 further comprising reallocating at least a portion of the future idle capacity of the network.

12. The method of claim 11 further comprising ensuring a minimum quality of service is maintained when at least a portion of the future idle capacity of the network is reallocated.

13. The method of claim 12, wherein ensuring a minimum quality of service comprises assigning a quality of service threshold setting a minimum reliability.

14. A non-transitory computer-readable medium having a plurality of non-transitory instructions executable with a processor to predict future network traffic, the plurality of non-transitory instructions being executable for:

measuring network traffic over a first time window to create a plurality of traffic histories over the first time window, each traffic history over the first time window including a plurality of respective network traffic measurements made at different times within the first time window;

applying a clustering algorithm to the plurality of traffic histories over the first time window to group the plurality of traffic histories over the first time window into k clusters of traffic histories defined by similar network traffic over the first time window, wherein (i) k is an integer greater than one and (ii) each cluster of the k clusters of traffic histories includes a respective two or more of the plurality of traffic histories over the first time window;

matching current network traffic to a first cluster of traffic histories of the k clusters of traffic histories based on similarity of the current network traffic to the first cluster of traffic histories;

determining a probability distribution of maximum future traffic values associated with the first cluster of traffic histories, each maximum future traffic value associated with the first cluster of traffic histories representing a maximum future value of a respective one of the traffic histories over the first time window of the first cluster of traffic histories during a second time window that is after the first time window; and predicting that a future network traffic rate will not exceed a specified statistical parameter of the probability distribution of the maximum future traffic values associated with the first cluster of traffic histories.

15. The non-transitory computer-readable medium of claim 14, wherein the first time window and the second time window are continuous or discontinuous and of equal duration or unequal duration.

16. The non-transitory computer-readable medium of claim 14 further comprising the plurality of non-transitory instructions being executable for subtracting a predicted value of the future network traffic rate from a maximum network capacity to determine a future idle capacity of the network.

17. The non-transitory computer-readable medium of claim 16 further comprising the plurality of non-transitory instructions being executable for reallocating at least a portion of the future idle capacity of the network.

18. The non-transitory computer-readable medium of claim 17 further comprising the plurality of non-transitory instructions being executable for ensuring that a minimum quality of service is maintained when at least a portion of the future idle capacity of the network is reallocated.

* * * * *